Aug. 4, 1931.　　C. COHEN-VENEZIAN　　1,817,859

VEHICLE WITH LOAD LIFTING MEANS

Filed May 21, 1930

Inventor:-
Carlo Cohen-Venezian

Patented Aug. 4, 1931

1,817,859

UNITED STATES PATENT OFFICE

CARLO COHEN-VENEZIAN, OF TURIN, ITALY

VEHICLE WITH LOAD LIFTING MEANS

Application filed May 21, 1930, Serial No. 454,438, and in Italy May 28, 1929.

The present invention has for its object a vehicle provided with a pivotally mounted frame which may be caused to overhang from one of the vehicle ends to provide means for lifting loads.

The vehicle according to this invention may be a motor vehicle or a trailed one and it provides for manœuvres on land and particularly for rescuing aeroplanes, vehicles and the like after an accident.

Figure 1:
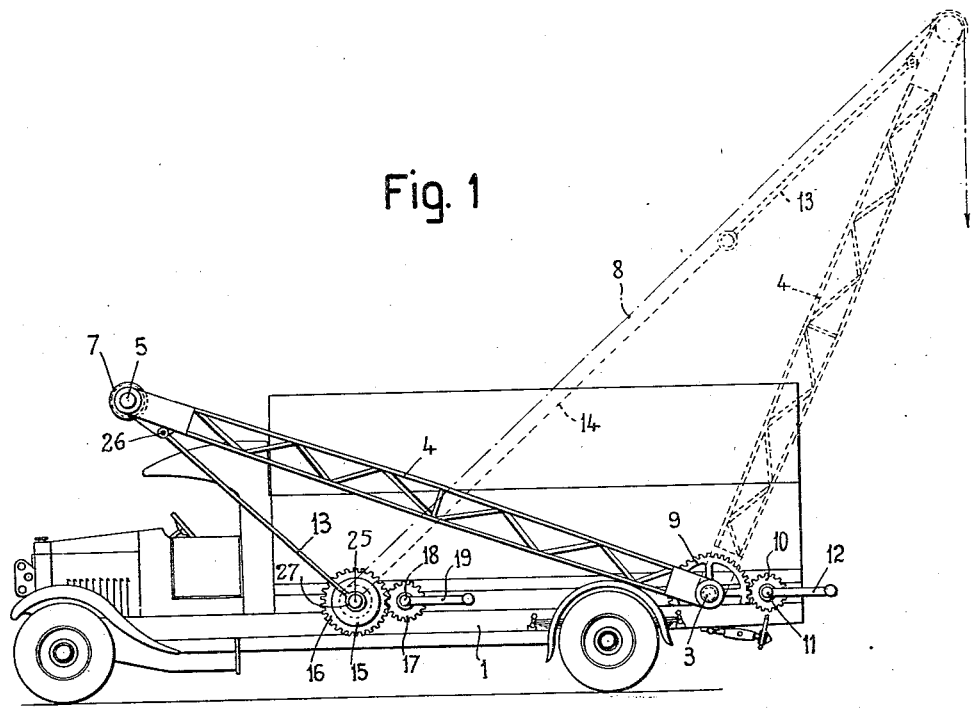
Figure 2:
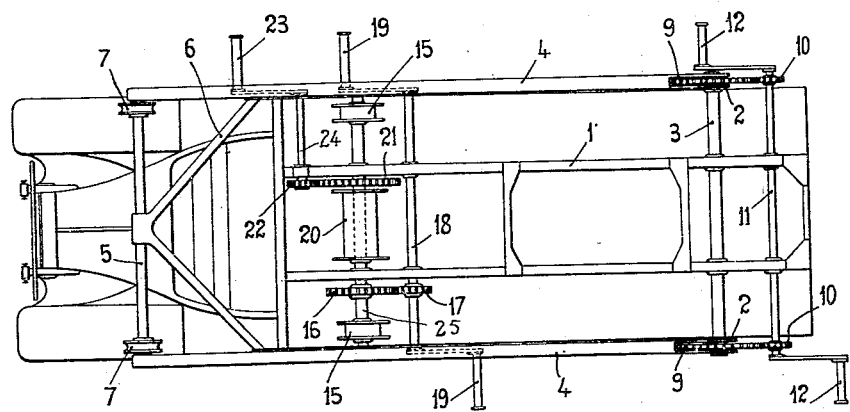

On the annexed drawings is shown by way of example an embodiment of this invention and Figure 1 is a side view of a vehicle equipped in accordance with this invention;

Figure 2 is a plan view of the same to an enlarged scale.

As shown in said figures, the vehicle comprises a chassis 1 at whose rear end a shaft 3 is fulcrumed in bearings 2 said shaft 3 having two side arms 4, 4 solid with its respective ends; a transverse bar 5 and braces 6 interconnect the free ends of said arms.

Grooved pulleys 7 are loose on bar 5 to support lifting ropes 8 (Fig. 1).

Gear wheels 9 are solid with said shaft 3 and in mesh with pinions 10 carried by a shaft 11 which is journalled on vehicle chassis 1 and is operated by means of cranks 12 solid therewith.

The frame consisting of arms 4 and cross bar 5 when in its lowered position shown in full lines in Fig. 1 bears on struts 13 fulcrumed on said frame at 26 and having end eyes 27 removably fastened on ends of a shaft 25 journalled on the vehicle chassis 1, while said frame 4—5 is supported in overhanging or operative position (shown in dotted lines in Fig. 1) by cords 14 connected with end of struts 13 and with shaft 25. Load lifting ropes 8 are actuated by drums 15 solid with shaft 25 and operated by means of cranks 19 solid with shaft 18 journalled in the vehicle chassis 1, pinion 17 of the same, and pinion 16 meshing with pinion 17 and solid with drum shaft 25.

A drum 20 is loose on shaft 25, it being actuated by means of gear wheel 21 and pinion 22 carried by shaft 24 having a crank 23 solid therewith.

When lifting means of the vehicle are inoperative, the frame 4—5 is in the full line position of Fig. 1, it being supported in this position by struts 13 pivoted thereon at 26 and having their end eyes 27 engaged with ends of shaft 25.

When required, struts 13 are released from shaft 25 and cranks 12 are actuated to drive pinions 10 and gear wheels 9, the said frame 4—5 solid with shaft 3 of wheels 9 being thus oscillated from full line position into dotted position of Fig. 1; said frame is then supported in overhanging position by cords 14 connected with struts 13 and shaft 25.

To lift a load it is attached to ropes 8 which are actuated by means of winches comprising drums 15 and actuating means 16, 17, 18, 19.

A winch comprising drum 20 with actuating means 21, 22, 24, 23 may be availed of for actuating a rope (not shown) intended to produce a pull along a substantially horizontal line when required.

What I claim as my invention and desire to secure by United States Letters Patent is:

A vehicle comprising a chassis, a transverse shaft rotatable in said chassis adjacent one end of the same, arms having one end solid with said shaft, means interconnecting the free ends of said arms, means for actuating said shaft to oscillate said arms from and to a position along said vehicle chassis to and from a position overhanging said vehicle chassis end, struts having one end pivoted on said interconnected arms and their other end releasably anchored on said vehicle chassis, extensible means connecting the last named ends of said struts with said vehicle chassis, and load lifting means provided on said vehicle and cooperating with said interconnected arms.

In testimony whereof I have signed my name to this specification.

CARLO COHEN-VENEZIAN.